Oct. 15, 1957 E. ROESCH 2,809,396
TIRE MOLD HINGE PIN STABILIZING UNIT
Filed Feb. 25, 1957 2 Sheets-Sheet 1
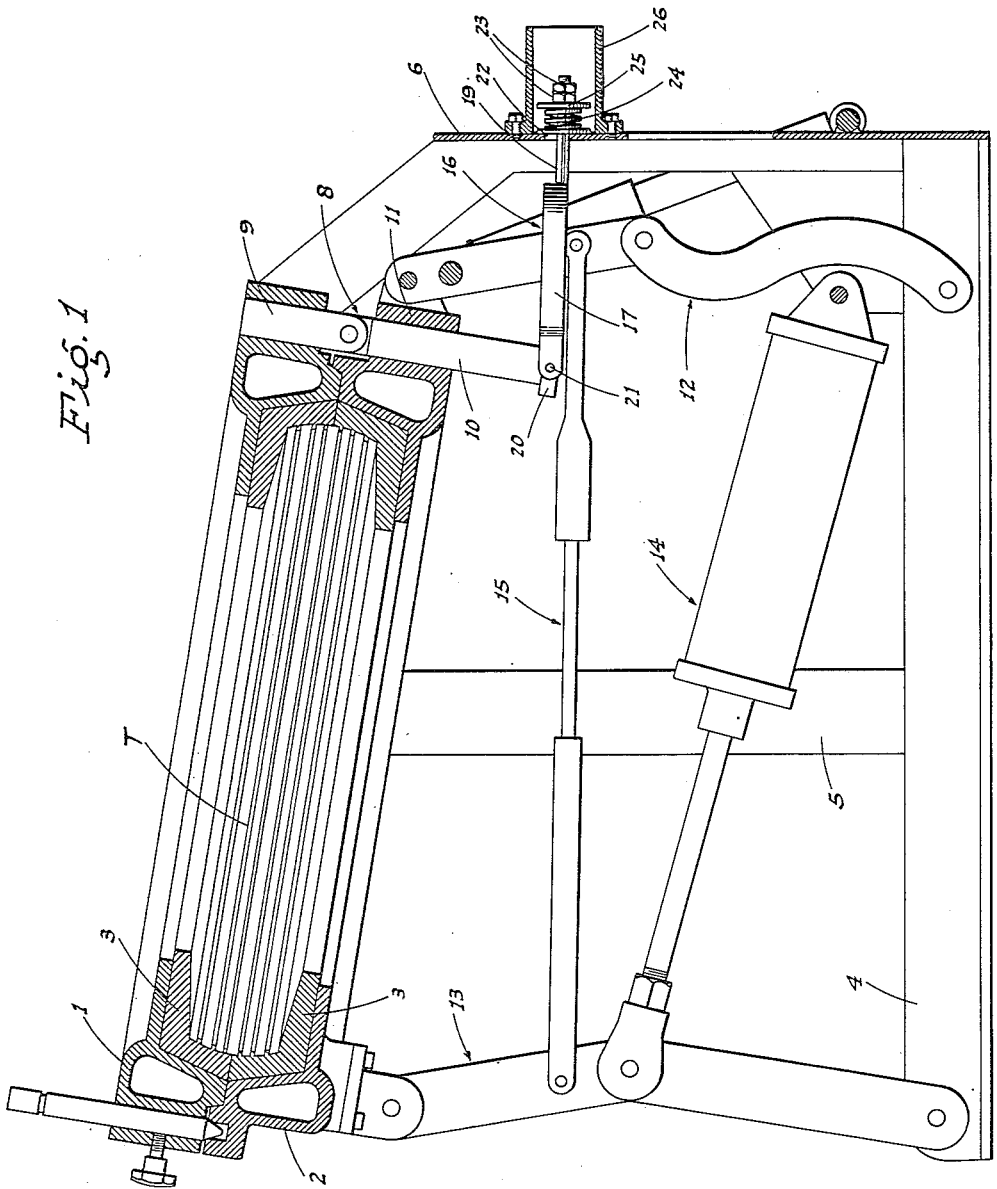
INVENTOR.
Ernst Roesch
BY
ATTYS Oct. 15, 1957     E. ROESCH     2,809,396
TIRE MOLD HINGE PIN STABILIZING UNIT
Filed Feb. 25, 1957     2 Sheets-Sheet 2
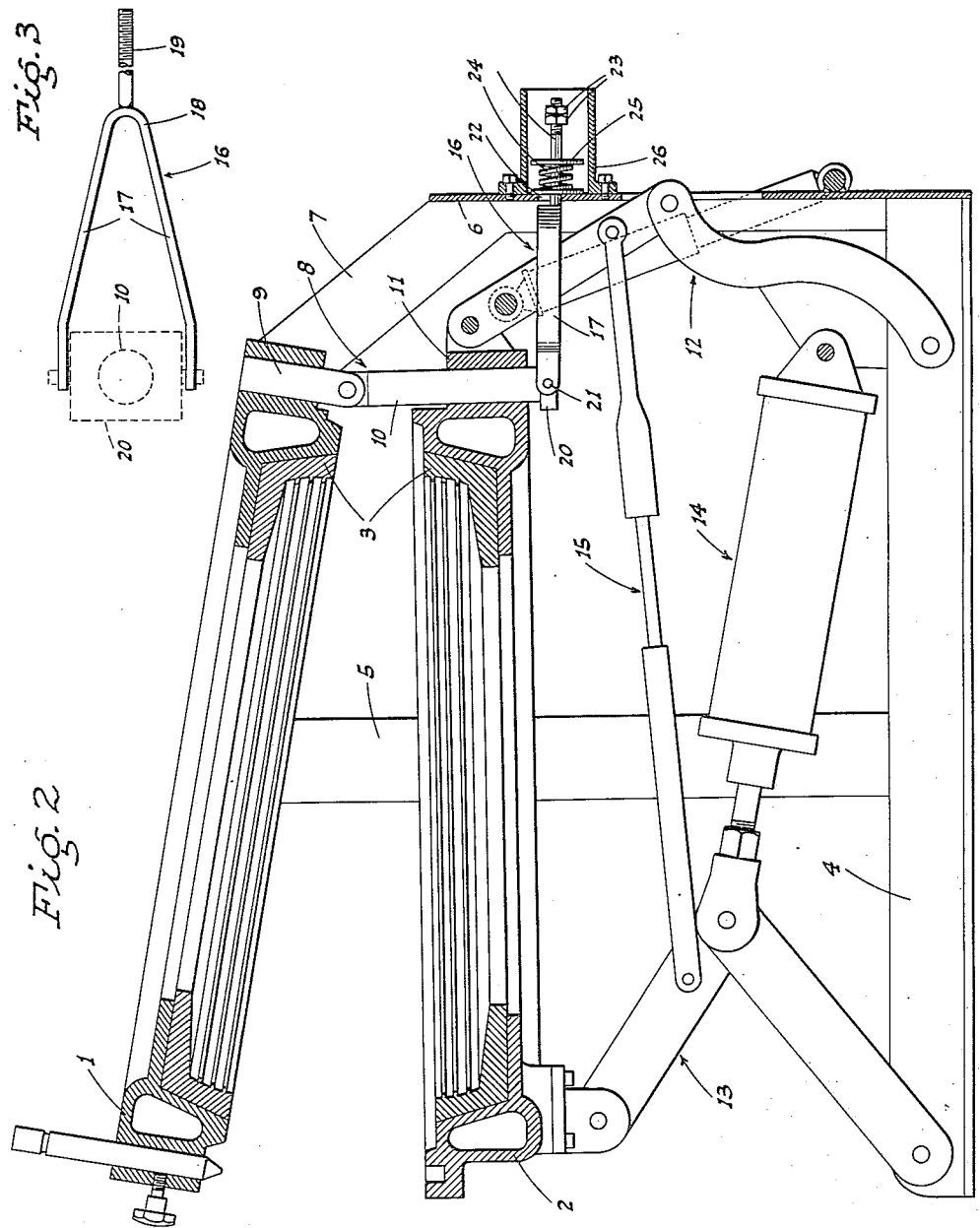
INVENTOR.
Ernst Roesch
BY
Webster & Webster
ATTYS

2,809,396

TIRE MOLD HINGE PIN STABILIZING UNIT

Ernst Roesch, Lodi, Calif., assignor to Super Mold Corporation of California, Lodi, Calif., a corporation of California Application February 25, 1957, Serial No. 642,231

6 Claims. (Cl. 18—18)

This invention relates to a tire retreading mold of the full-circle hinged body-section type, and particularly represents an improvement over the mold shown in United States Patent No. 2,255,770, dated September 16, 1941.

Such a mold includes upper and lower body sections; the upper section being fixed and the lower section being movable downwardly to an open position. Guide and control means are provided for moving the lower body section in a manner to cause the same to remain parallel to the upper body section during the initial portion of the opening movement, and to then cause the lower body section to assume an angular position relative to the upper body section. The guide means includes a hinge pin depending from the upper body section and on which the lower body section is slidable; said pin being parallel to the axis of the lower body section and terminating in a free or unsupported end therebelow.

This was satisfactory with relatively small-width tires, but when the pin was lengthened and the control means modified to allow of the greater opening of the mold necessary to accommodate wider tires, it was found that upon closing the mold the lower body section would not close smoothly and would chatter while sliding upwardly on the hinge pin, due to the flexibility thereof caused by its additional length.

It is therefore the principal object of the present invention to remedy this objectionable action by providing a support for the lower end of the hinge pin which will act to stiffen the pin while the lower body section is moving up said pin and is parallel to the upper body section, but which does not interfere with the swinging of the pin with said mold section, as is necessary during the movement of the section to and from an angular position relative to the upper body section.

Another object of the invention is to provide a practical, reliable, and durable tire mold hinge pin stabilizing unit, and one which will be exceedingly effective for the purpose for which it is designed.

These objects are accomplished by means of such structure and relative arrangement of parts as will fully appear by a perusal of the following specification and claims.

In the drawings:

Fig. 1 is a sectional elevation of the mold equipped with the hinge-pin supporting device; the mold being closed about a tire.

Fig. 2 is a similar view, showing the mold in a fully opened position.

Fig. 3 is a top plan view of the yoke of the pin-supporting device, detached.

Referring now more particularly to the drawings, and to the characters of reference marked thereon, the mold comprises upper and lower full-circle body sections 1 and 2 with which suitable heating means is incorporated. Matching matrix sections 3 to engage a tire T are mounted in the body sections.

The upper section 1 is rigidly supported in a fixed and somewhat elevated position relative to a base 4 by means of uprights 5 projecting upwardly from the base on opposite sides of and outside the section, and a third upright 6 also on the outside of the section 1 and disposed in a plane diametrally of said section midway between uprights 5. The upright 6 is spaced some distance out from section 1, and is connected at its upper end to said section by means of transversely spaced arms 7.

The lower body section 2 is mounted in connection with section 1 for combined angular and parallel movement relative to said section 1 by means of a transverse-axis hinge 8 located in a plane between arms 7, and which hinge comprises an upper portion 9 secured in section 1 and a lower depending pin 10 slidable through a boss 11 in body section 2, and which maintains pin 10 parallel to the axis of said body section.

The lower body section 2 is connected to the base 4 by opposed toggle link units 12 and 13, which break or fold in the same direction. Link unit 12 is disposed between upright 6 and hinge 8, while unit 13 is disposed in diametrally opposed relation thereto. A hydraulic cylinder unit 14 is connected to the base 4 and to the unit 13 to extend and contract the same, while a telescoping or collapsible pull unit 15 extends between, and is connected to, corresponding links of the toggle units 12 and 13.

Unit 15 is arranged relative to the toggle link units so that when unit 13 is fully extended by the action of the cylinder unit 14, the pull unit 15 is also fully extended and pulls the unit 12 to a fully extended position also, as shown in Fig. 1; said unit 12 collapsing to a lesser extent than unit 13, as shown in Fig. 2.

By means of this arrangement, which is the same as shown and described in the previous patent, No. 2,255,770, the lower body section 2—when the cylinder unit 14 is actuated to contract the same—will first move down parallel to the upper section 1, sliding down on the lower hinge pin portion 10, and will thereafter assume the angular position relative to body section 1.

Upon the cylinder unit being then extended, the body section 2 first moves up to a parallel position relative to section 1, and then moves upwardly to a closing position with said section 1.

It is to avoid the chattering and uneven movement of the lower body section 2 as it moves up the pin 10 that the feature of the present invention—now to be described—is provided.

This feature comprises a substantially horizontal yoke 16 which consists of a pair of transversely spaced arms 17 connected together at one end, as at 18, and having a threaded stem 19 projecting lengthwise from the connected ends of the arms, as clearly shown in Fig. 3.

The yoke arms are disposed between the upright 6 and the pin portion 10, and at their free end embrace a block 20 secured on the lower end of pin portion 10, and to the sides of which block the arms are pivoted, as at 21. The stem 19 slidably projects through an opening 22 in the upright 6, and on its outer end—outwardly of the upright—is provided with adjustable nuts 23 arranged together in locking relation.

A relatively stiff helical compression spring 24 is mounted on the stem 19 between the upright 6 and the nuts 23; a washer 25 engaging the stem and the outer end of the spring between said spring and the nuts.

The nuts are set on the stem 19 so that when the mold is fully closed the spring 24 is compressed just sufficient to maintain the pin 10 in the desired and necessarily exact parallel relationship with the axis of the upper body section 1, as shown in Fig. 1.

At the same time, nothing interferes with the swinging of the pin 10 away from such parallel relationship as the lower body swings to an angular position, as shown in Fig. 2.

It may be noted that the nuts 23 could be adjusted to directly engage the upright 6 without the spring being interposed, but the setting of the nuts to properly position the pin 10 is so critical that a very small misadjustment of the nut is sufficient to throw said pin out of line. The use of the spring between the upright and nuts allows for considerable latitude in the setting of the nuts while maintaining the pin 10 in its proper position and assuring the desired smooth operation of the mold.

The spring, washer, and nuts, together with the adjacent portion of the stem 19, are protected by an open-ended housing 26 secured on the outside of the upright 6.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful, and upon which Letters Patent are desired:

1. In a tire mold which includes upper and lower annular body sections having matrix elements thereon arranged to engage a tire when the body sections are closed with each other, a horizontal transverse axis hinge secured on the upper body section adjacent the periphery thereof and including a depending pin projecting through the lower body section parallel to the axis thereof and on which pin said lower body section is slidable, means including an upstanding member disposed clear of the lower body section at the hinged end thereof supporting the upper body section in a fixed position, and means to control the opening and closing movement of the lower body section relative to the upper body section and arranged so that said lower body section when in a fully open position, will be disposed at an angle to the upper body section and when being closed will first swing with the pin to a position parallel to the upper body section and will then slide upwardly on the pin to a fully closed position; and means between the pin below the lower body section and the upstanding member to allow said pin to swing with the lower body section in one direction relative to the axis of the upper body section while preventing the pin from movement in the opposite direction beyond a position parallel to said axis of said upper body section.

2. A structure, as in claim 1, in which said means comprises a substantially horizontal yoke pivotally connected at one end with the lower end of the pin and extending in a direction away from the body sections at right angles to the axis of the hinge, said yoke including a stem slidably projecting through the upstanding member, and stop means on the stem between the outer end thereof and said member.

3. A structure, as in claim 2, in which the stem is threaded and said stop means includes a nut adjustment on the stem.

4. A structure, as in claim 1, in which said means comprises a substantially horizontal yoke pivotally connected at one end with the lower end of the pin and extending in a direction away from the body sections at right angles to the axis of the hinge, said yoke including a stem slidably projecting through the member, a compression spring on the stem outwardly of the member, and an adjustment nut on the stem outwardly of the spring and arranged to engage the same when the spring is in engagement with the member and the pin is disposed in parallel relationship with the axis of the upper body section.

5. In a tire mold which includes upper and lower body sections, a fixed member to which the upper body section is rigidly secured, a hinge connecting the body sections adjacent the periphery thereof whereby the lower body section is swingable between a raised closed position and a lowered open position, means to so swing the lower body section, the hinge including a depending hinge pin on which the lower body section slides as it so swings, the pin depending below the lower body section, and a stabilizing connection between the fixed member and said pin below said lower body section.

6. A structure, as in claim 5, in which the pin swings with said lower body section; and said stabilizing connection is arranged to allow said pin to swing with the lower body section in one direction relative to the axis of the upper body section while preventing the pin from movement in the opposite direction beyond a position parallel to said axis of said upper body section.

References Cited in the file of this patent
UNITED STATES PATENTS

| | | |
|---|---|---|
| 2,148,416 | Brundage | Feb. 21, 1939 |
| 2,255,770 | Glynn | Sept. 16, 1941 |
| 2,310,674 | Bostwick | Feb. 9, 1943 |